Oct. 22, 1968     S. FISCHER     3,406,699
PROCESS AND APPARATUS FOR THE CHARGING OF A
PLURALITY OF INJECTION HEADS
Filed Oct. 19, 1965

INVENTOR
STEFAN FISCHER
BY
Burton L. Lilling
ATTORNEY

United States Patent Office 3,406,699
Patented Oct. 22, 1968

3,406,699
PROCESS AND APPARATUS FOR THE CHARGING OF A PLURALITY OF INJECTION HEADS
Stefan Fischer, Lohmar, Bezirk Cologne, Germany
Filed Oct. 19, 1965, Ser. No. 497,739
Claims priority, application Germany, Oct. 19, 1964,
F 44,263
8 Claims. (Cl. 137—1)

ABSTRACT OF THE DISCLOSURE

This invention relates essentially to a method and apparatus for feeding a plurality of extrusion or injection heads from a single extruder comprising, apparatus having an inlet for connection to an extruder and a plurality of outlets for connection to each head, and passageways in fluid communication with said inlet and said outlets, for the equal distribution of extrudate into each of said outlets.

---

This invention relates generally to the charging or feeding of plasticized plastic material to two or more extrusion or injection heads, by means of only one extruder the material flow of which is subdivided into several partial flows of which each is routed to an individual injection head.

In those cases in which up to now, as for example in the production of hollow bodies by the blow-molding process, two or sometimes several injection heads are fed from a single screw type extruder or the like, each of which injection heads in their turn supplied a linear dimensioned product, this product, for instance, a tube serving as a preform for a hollow body, showed so called "cold spots" likely to result in an unsatisfactory finished product or even rejects, depending upon the material used and the expansion or "blow" ratio. In a number of cases, therefore, there are many restrictions with regard to shaping or forming respectively of the bodies and also with regard to the material which can be used. Production units which should, of course, be as versatile and universally employable as possible with a view to economy of production, are, therefore, subject to limitations in their utilization partly because of the shape of the object to be produced, and partly because the material required for its production is a decisive factor.

It is intended by the utilization of the present invention to avoid these faults and difficulties as far as possible. For this purpose, the invention provides for a process for the charging or feeding respectively of two or more injection heads from a single screw type extruder or the like; wherein the flow of material leaving the extruder, which is normally of a non-uniform temperature over its cross-section, is separated into two or more partial flows, each of which will show a uniform or substantially uniform temperature along the cross-section of its respective flow. Normally, the material flow leaving a screw type extruder has its highest temperature at the center of its cross-section which temperature decreases progressively toward its outer line adjacent the cylinder wall. In all other present methods for the separation of the material flow into partial flows a part of this warmer material reaches the outer periphery of the extrudate and thus results in the undesirable heat traces or "cold spots" which may, for instance, lead to non-uniform forming of the tube segment or parison during the blowing process; because, the material in the areas of higher temperature is more readily expanded than the material in the areas of lower temperature. A difference in the temperatures of the individual partial flows, as regards one flow to the other, may sometimes be desirable. If it is desired, however, to work with partial flows to be routed to the individual injection heads, each to have the same uniform temperature; it is possible, according to another feature of this invention, to have the separation of the total flow into partial flows followed by a heat treatment of the material which may consist either of additional heating of individual partial flows or of cooling of individual partial flows. Particularly, in supporting these actions, it will be possible to effect, if desirable, a certain control of the temperature at certain portions of the cross-section of the total material flow prior to its separation into partial flows.

Furthermore, this invention provides for an apparatus for the charging or feeding of two or more injection heads in a plastics processing machine, by a single extruder, which apparatus is especially constructed for the utilization of the process described above; one side of which is connectable to the extruder and the other side of which is connectable to the feed lines routed to the individual injection heads and which includes branch lines subdividing the total material flow into two or more partial flows; and, in which, according to this invention, the cross section areas of the inlet portions of the branch lines will mate with a corresponding portion of the cross-section area of the main line, wherein material of equal or substantially equal temperature is flowing. In this case it will be practical to position the inlet portions of the branch lines directly adjacent to each other and adjacent a cross-section area of the main line. Accordingly, the cross-sections of the inlet openings of the branch lines, where the main line is of a circular cross-section, may constitute concentric rings around a circular center line. Also, it will be possible to obtain, by an appropriate dimensioning of the size of the inlet area of the branch lines or of the cross-section of the branch lines respectively, with a view toward the temperature of the mass flowing in the lines, a uniform output in all branch lines. It will also be possible in this way to control the material output in the individual branch lines as desired.

According to another feature of this invention, cooling units and/or heating units may be inserted into the branch lines which may alternatively be switched "on" and "off". A practical construction of the unit, in accordance with the teachings of this invention, for the feeding of two injection heads from an extruder—which is the case most frequently occurring in practice—will provide that the total mass channel connected to the extruder be subdivided, by means of an insertion piece, into two branch channels the mouth areas of which form concentric circular or ring areas respectively. One of these two branch lines which is connected to the ring area may, in this case, be in connection with the mouth area by guide channels leading around the inner branch line. Normally, a subdivision of the inlet cross-sections into two guide channels, which may be provided as grooves in the exterior part of the insertion piece and which meet at the connection point of the corresponding branch line, will be sufficient. Accordingly, it will, of course, also be possible in the same way to connect three or more branch lines.

The invention allows for a wide range of possible designs. There are in the drawings examples of various types of construction, in which.

Figure 1:
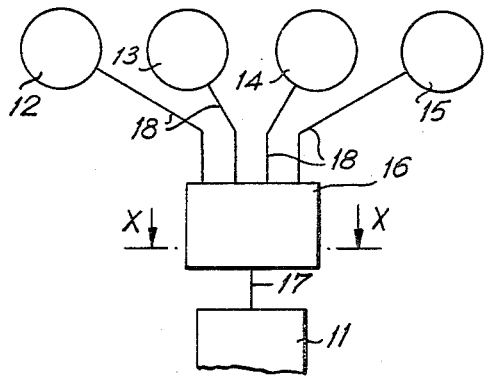
FIGURE 1 is a simplified diagram representative of this invention.

In the diagram according to FIGURE 1 the principal figure is based upon the situation that four injection heads 12, 13, 14 and 15 are to be connected to an extruder 11. Connection of the injection heads is effected via a distributing unit 16 according to the invention the inlet side of which is connected to the extruder 11 via a line 17 and to the outlet side of which the injection heads 12, 13, 14 and 15 are connected via four branch lines 18. The distributing unit 16, which is inserted between the extruder 11 and the injection heads 12, 13, 14 and 15, insures the distribution of plasticized plastic material, of a substantially uniform temperature along the total cross-section of the line, to each injection head via the corresponding line 18. This is achieved by the fact that the mouths of the branch lines 18 are distributed along the cross section of the main line in such a way and are so shaped in cross-section as to receive from the mass of material flowing in the main line 17 only that synthetic material having a uniform or substantially uniform temperature.

Figure 1A:
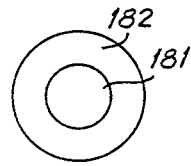
FIGURE 1a is a schematic sectional view taken generally along line X—X of FIGURE 1 showing one embodiment of this invention.
Figure 1B:
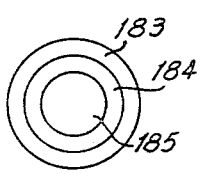
FIGURE 1b is a schematic sectional view taken generally along line X—X of FIGURE 1 showing an alternative embodiment of this invention.
Figures 1C, 1D:
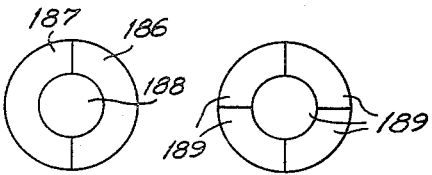
FIGURE 1c is a schematic sectional view taken generally along line X—X of FIGURE 1 showing a third alternative embodiment of this invention.
FIGURE 1d is a schematic sectional view taken generally along line X—X of FIGURE 1 showing a fourth alternative embodiment of this invention.

This is effected in a simple manner, which is in most cases sufficient for practical requirements, by branching off from the center of the flow line, which is the hottest portion of the flow, utilizing a branch line having an inlet of circular configuration. The other branch lines may have ring shaped inlets arranged concentrically to this central branch line, i.e. any additional branch lines may have a ring shaped inlet area of its own, arranged concentrically to the central branch line; and the inlets of two or more branch lines may be arranged within a concentric inlet ring area. If only two injection heads are to be fed, an arrangement according to FIG. 1a may be chosen in which the annular mouth 182 of the second branch line is surrounding the central mouth 181 of the first branch line. With three injection heads an arrangement according to FIG. 1b or FIG. 1c may be chosen. In the first instance (FIG. 1b) the mouths 183 and 184 of two branch lines form concentric rings around the circular central mouth 185 of the third line; whereas, in the second instance (FIG. 1c) the mouths 186 and 187 of two branch lines are surrounding the central mouth 188 of the third branch line in two semi-circles. By subdividing the outer ring surface into four parts, as shown in FIG. 1d, one obtains five branch lines 189, which may be connected to five injection heads. If the outer ring is divided into three parts, it will be possible to connect four injection heads. Apart from these examples a wide range of variations and combinations will be possible.

Figure 2:
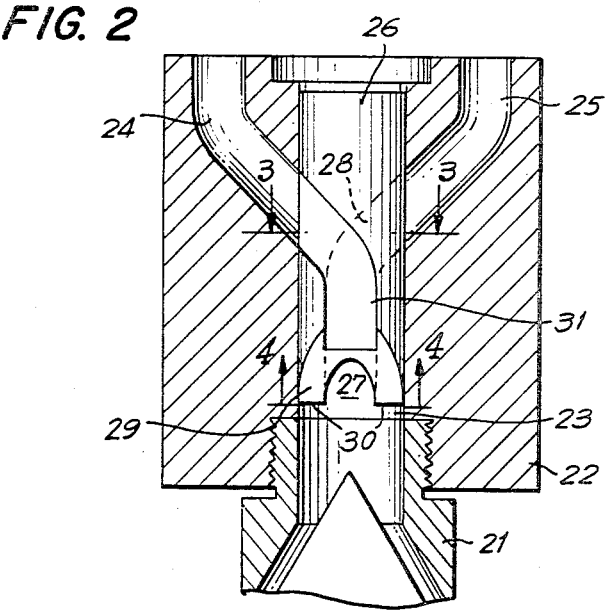
FIGURE 2 is a sectional plan view of one embodiment of this invention, suitable for the feeding of two injection heads from an extruder.
Figure 3:
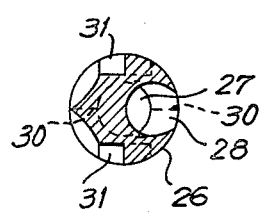
FIGURE 3 is a sectional view taken generally along line 3—3 of FIGURE 2.
Figure 4:
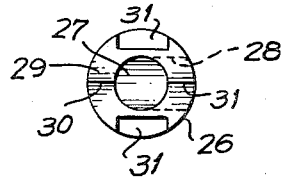
FIGURE 4 is a sectional view taken generally along line 4—4 of FIGURE 2.

FIGS. 2 and 3 are an example of an especially simple type of construction of a unit, in accordance with this invention, providing for the feeding of two injection heads by means of a single extruder. Connected to the outlet of an extruder 21, is a line piece or body 22 comprising a main channel 23 for the total mass flow from the extruder and two branch channels 24 and 25 by means of which the subdivided mass is routed to the individual injection heads. Subdividing of the total mass flow into two partial flows is effected by an insertion piece or distribution piece 26 respectively which is inserted in the main channel 23 and which closes the main channel 23 at its end opposite the extruder. The said insertion piece 26 has a center bore 27 providing a channel for the central mass. The said channel or bore 27 is connected to the branch channel 25 by an angled channel 28. The ring area which remains between the center bore 27 and the wall of the main channel 23 is divided into two halves by the edge 30 which is formed by two sloping areas 29. The partial flow of the mass which arrives at the two sloping areas 29 outside of the bore 27 is then subdivided into two portions which are routed through groove shaped guide channels 31, provided in the circumference of the insertion piece 26, around the center bore 27, to the branch line 24 where they are united again in order to be routed onwards together.

What is claimed is:

1. In the method of feeding a plurality of injection heads with material of substantially uniform temperature to each head from an extruder having material flow of non-uniform temperature distribution across its cross-section, the steps which comprise: subdividing the cross-section of extruder flow into a central circular portion and at least one remaining portion, passing the central circular portion of the extruder flow to one head, passing the remainder of the extruder flow to the remaining heads; characterized in that each of said portions is of uniform temperature across its respective cross-section; and further characterized in subdividing said remainder of the extruder flow into annular concentric portions, subdividing the flow of each concentric portion, passing the flow of each subdivided portion downward and about the said central portion, reuniting the subdivided portions respectively of each concentric portion and passing said concentric portions to respective remaining heads.

2. In the method of feeding a plurality of injection heads with material of substantially uniform temperature to each head from an extruder having material flow of non-uniform temperature distribution across its cross-section, the steps which comprise: subdividing the cross-section of extuder flow into a central circular portion and at least one remaining portion, passing the central circular portion of the extruder flow to one head, passing the remainder of the extruder flow to the remaining heads; characterized in that each of said portions is of uniform temperature across its respective cross-section; and further characterized in subdividing said remainder of the extruder flow into an annular arrangement of arcuate segmental portions, passing the flow of each arcuate segmental portion downward and about the said central portion, and passing said segmental portions to respective remaining heads.

3. In the method of feeding a plurality of injection heads with material of substantially uniform temperature to each head from an extruder having material flow of non-uniform temperature distribution across its cross-section, the steps which comprise: subdividing the cross-section of extruder flow into a central circular portion and at least one remaining portion, passing the central circular portion of the extruder flow to one head, passing the remainder of the extruder flow to the remaining heads; characterized in that each of said portions is of uniform temperature across its respective cross-section; and further characterized in heat-treating at least one of said central and remaining portions subsequent to said subdivision.

4. In the method of feeding a plurality of injection heads with material of substantially uniform temperature to each head from an extruder having material flow of non-uniform temperature distribution across its cross-section, the steps which comprise: subdividing the cross-section of extruder flow into a central circular portion and at least one remaining portion, passing the central circular portion of the extruder flow to one head, passing the remainder of the extruder flow to the remaining heads; characterized in that each of said portions is of uniform temperature across its respective cross-section; and further characterized in controlling the temperature of the extruder flow, prior to the subdivision thereof, at certain cross-sectional areas thereof.

5. Apparatus for feeding a plurality of injection heads with material of substantially uniform temperature to each head from an extruder having material flow of non-uniform temperature distribution across its cross-section, said apparatus comprising a body having an inlet for connection to an extruder and a plurality of outlets for connection to injection heads, said body being formed with a first passageway having one end communicating with said inlet for receiving a central circular portion of the cross-sectional area of extruder flow and having its other end communicating with one of said outlets for discharging said central portion to one of said heads, said body being formed with at least one additional passageway having one end communicating with said inlet for receiving the remainder of said extruder flow and having its other end connected to the remainder of said outlets for discharging the remainder of said fluid flow to the remaining injector heads, each of said passageways being arranged to receive a portion of said extruder flow of substantially uniform temperature across its respective cross-section; in combination with heat-exchange means operatively associated with at least one of said passages.

6. Apparatus for feeding a plurality of injection heads with material of substantially uniform temperature to each head from an extruder having material flow of non-uniform temperature distribution across its cross-section, said apparatus comprising a body having an inlet for connection to an extruder and a plurality of outlets for connection to injection heads, said body being formed with a first passageway having one end communicating with said inlet for receiving a central circular portion of the cross-sectional area of extruder flow and having its other end communicating with one of said outlets for discharging said central portion to one of said heads, said body being formed with a plurality of additional passageways having their one ends communicating with said inlet for receiving the remainder of said extruder flow and having their other ends connected to the remainder of said outlets for discharging the remainder of said fluid flow to the remaining injector head, each of said passageways being arranged to receive a portion of said extruder flow of substantially uniform temperature across its respective cross-section; said one ends of said additional passageways being of annular cross-sectional configuration and extending about said first passageway, each of said additional passageways extending downward about said first passageway to a point distant from their said one ends and proximate their said other ends and connecting to a separate corresponding branch line for routing to a respective injection head.

7. Apparatus for feeding a plurality of injection heads with material of substantially uniform temperature to each head from an extruder having material flow of non-uniform temperature distribution across its cross-section, said apparatus comprising a body having an inlet for connection to an extruder and a plurality of outlets for connection to injection heads, said body being formed with a first passageway having one end communicating with said inlet for receiving a central circular portion of the cross-sectional area of extruder flow and having its other end communicating with one of said outlets for discharging said central portion to one of said heads, said body being formed with a plurality of additional passageways having their one ends communicating with said inlet for receiving the remainder of said extruder flow and having their other ends connected to the remainder of said outlets for discharging the remainder of said fluid flow to the remaining injector heads, each of said passageways being arranged to receive a portion of said extruder flow of substantially uniform temperature across its respective cross-section; said one ends of said additional passageways being of arcuate segmental configuration extending annularly in end-to-end relation about said first passageway, each of said additional passageways extending downward about said first passageway to a point of connection to a separate corresponding branch line for routing to an individual injection head.

8. Apparatus for feeding a plurality of injection heads with material of substantially uniform temperature to each head from an extruder having material flow of non-uniform temperature distribution across its cross-section, said apparatus comprising a body having an inlet for connection to an extruder and a plurality of outlets for connection to injection heads, said body being formed with a first passageway having one end communicating with said inlet for receiving a central circular portion of the cross-sectional area of extruder flow and having its other end communicating with one of said outlets for discharging said central portion to one of said heads, said body being formed with one additional passageway having one end communicating with said inlet for receiving the remainder of said extruder flow and having its other end connected to the remainder of said outlets for discharging the remainder of said fluid flow to the remaining injector heads, each of said passageways being arranged to receive a portion of said extruder flow of substantially uniform temperature across its respective cross-section; said one end of said additional passageway being of annular cross-sectional configuration and extending about said first passageway, said additional passageway being subdivided into at least two channels, each of said channels extending spirally downward about said first passageway and re-uniting at a point distant from its said one end and proximate its said other end and connecting to a separate corresponding branch line for routing to an individual injection head.

References Cited
UNITED STATES PATENTS

| | | | |
|---|---|---|---|
| 1,453,048 | 4/1923 | Kraft et al. | 18—8 |
| 2,569,857 | 10/1951 | Jaegle et al. | 285—132 X |
| 2,793,008 | 5/1957 | Donegan | 285—133 X |
| 3,103,942 | 9/1963 | Sharp | 137—1 |
| 3,110,754 | 11/1963 | Witort et al. | 285—131 X |
| 3,275,725 | 9/1966 | Utz | 18—14 |

HENRY T. KLINKSIEK, *Primary Examiner.*